US008032005B2

(12) United States Patent
Toyama et al.

(10) Patent No.: US 8,032,005 B2
(45) Date of Patent: Oct. 4, 2011

(54) INFORMATION PROCESSING APPARATUS AND METHOD OF REPRODUCING CONTENT PROVIDED BY SAID APPARATUS

(75) Inventors: Takeshi Toyama, Kanagawa-ken (JP); Hiroyasu Ito, Tokyo (JP); Makoto Kobayashi, Kanagawa-ken (JP); Kyohei Inukai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1358 days.

(21) Appl. No.: 11/467,575

(22) Filed: Aug. 28, 2006

(65) Prior Publication Data

US 2007/0047909 A1    Mar. 1, 2007

(30) Foreign Application Priority Data

Aug. 30, 2005   (JP) .................................. 2005-249945

(51) Int. Cl.
*H04N 5/92* (2006.01)
(52) U.S. Cl. ........................................................ 386/241
(58) Field of Classification Search ............... 386/46
See application file for complete search history.

(56) References Cited

U.S. PATENT DOCUMENTS

| | | | | |
|---|---|---|---|---|
| 6,064,380 A * | 5/2000 | Swenson et al. | ............... | 715/273 |
| 2002/0104092 A1 | 8/2002 | Arai et al. | ........................ | 725/87 |
| 2004/0073610 A1 | 4/2004 | Terada et al. | | |
| 2005/0027740 A1 | 2/2005 | Moritani et al. | | |
| 2005/0055352 A1 * | 3/2005 | White et al. | ..................... | 707/10 |
| 2005/0094031 A1 | 5/2005 | Tecot et al. | | |
| 2005/0251835 A1 | 11/2005 | Scott, III et al. | | |
| 2006/0120690 A1 * | 6/2006 | Park | ............................... | 386/95 |
| 2006/0140067 A1 * | 6/2006 | Kizuki et al. | ............... | 369/30.01 |
| 2007/0047902 A1 | 3/2007 | Ito et al. | | |

FOREIGN PATENT DOCUMENTS

| | | |
|---|---|---|
| JP | 2002-044586 | 2/2002 |
| JP | 2002-232861 | 8/2002 |
| JP | 2003-018576 A | 1/2003 |
| JP | 2004-128597 A | 2/2004 |
| JP | 2005-045510 A | 2/2005 |
| JP | 2005-065214 | 3/2005 |
| JP | 2005-151445 A | 6/2005 |
| JP | 2006-319443 A | 11/2006 |

OTHER PUBLICATIONS

Jan. 31, 2011 U.S. Office Action, that issued in U.S. Appl. No. 11/467,624.
May 9, 2011 Japanese Office Action, without an English Translation, that issued in Japanese Patent Application No. 2005-249945.
May 13, 2011 Japanese Office Action, that issued in Japanese Patent Application No. 2005-249946.
The above references were cited in a May 13, 2011 Office Action issued in Japanese Application No. 2005-249946 which is a counterpart of related U.S. Appl. No. 11/467,624.

* cited by examiner

*Primary Examiner* — Peter-Anthony Pappas
*Assistant Examiner* — Daniel Tekle
(74) *Attorney, Agent, or Firm* — Cowan, Liebowitz & Latman, P.C.

(57) ABSTRACT

Content managed as a content directory is allowed to be selected from a playback apparatus on a network and the playback apparatus is allowed to play back the content. If playback of the content is suspended, the position at which playback was suspended is stored. This content is set in the content directory as virtual content. If this virtual content is selected, playback of the virtual content is resumed from the position at which suspension occurred.

12 Claims, 11 Drawing Sheets

FIG. 5

```
<DIDL-Lite xmlns:dc="http://purl.org/dc/elements/1.1/"
  xmlns:upnp ="urn:schemas-upnp-org:metadata-1-0/ upnp /"
  xmlns="urn:schemas-upnp-org:metadata-1-0/DIDL-Lite/">
    <item id="100" parentID="123" restricted="false">
    <dc:title>Love Story</dc:title>
    <dc:creator>xxxxx</dc:creator>
    <upnp:class>object.item.videoItem</upnp:class>
    <res protocolInfo="http-get:*:video/mpeg:*"size="250000000">
        http://192.1.2.3/123456-100.mpg
    </res>
    </item>
    <item id="101" parentID="123" restricted="false">
    <dc:title>Comedy</dc:title>
    <dc:creator>yyyyy</dc:creator>
    <upnp:class>object.item.videoItem</upnp:class>
    <res protocolInfo="http-get:*:video/mpeg:*"size="200000000">
        http://192.1.2.3/123456-101.mpg
    </res>
    </item>
    <item id="102" parentID="123" restricted="false">
    <dc:title>Love Story-Stopped</dc:title>
    <dc:creator>xxxxx</dc:creator>
    <upnp:class>object.item.videoItem</upnp:class>
    <res protocolInfo="http-get:*:video/mpeg:*"size="150000000">
        http://192.1.2.3/123456-102.mpg
    </res>
    </item>
</DIDL-Lite>
```

| TITLE | TYPE | SIZE |
|---|---|---|
| Love Story | VIDEO | 250,000KB |
| Love Story-Stopped | VIDEO | 150,000KB |
| Comedy | VIDEO | 200,000KB |

600, 601, 602, 603, 611, 612, 613

INFORMATION PROCESSING APPARATUS AND METHOD OF REPRODUCING CONTENT PROVIDED BY SAID APPARATUS

BACKGROUND OF THE INVENTION

1. Field of the Invention

The present invention relates to an information processing apparatus having a function for selecting content, which is managed as a content directory, from a playback apparatus on a network, and causing the playback apparatus to reproduce the content.

2. Description of the Related Art

Systems that store content such as movies, still images and music on a storage device such as a hard disk and reproduce such content so that it may be seen and heard have become widespread in recent years. In such a configuration for utilizing content, there is a resumption playback function for suspending playback of the content and subsequently resuming playback of the content from the location at which playback was suspended.

Resumption playback is such that, first, when playback is suspended, the location of suspension is set in the storage device as a "bookmark", then the operator selects the desired "bookmark" to achieve resumption from the location of suspension.

There has also been proposed a form of utilization in which an information processing apparatus such as a personal computer and a playback apparatus such as a TV are connected via a network and content that has been stored in the information processing apparatus is reproduced by the playback apparatus so that it can be seen and heard.

In such a system that allows the viewing and hearing of content that has been stored in an information processing apparatus via a network, processing for setting or selecting a "bookmark" must be executed via the network in order to implement resumption playback.

To achieve this, "bookmark" registration and selection is implemented between an information processing apparatus and a playback apparatus by a variety of specifications developed by a number of companies. That is, in a form of utilization that plays back content via a network, it is necessary for the information processing apparatus and playback apparatus to be provided by the same manufacturer in order to implement resumption playback.

However, it may be assumed that a plurality of personal computers and a plurality of TVs will be connected to a network within the home. Purchasing from the same manufacturer all of the information processing apparatuses and playback apparatuses connected to the network would impose a severe restriction upon the user's freedom of choice regarding such merchandise. This is undesirable.

SUMMARY OF THE INVENTION

Accordingly, an object of the present invention is to solve the foregoing problem and allow the playback of content from the location at which playback has been suspended without requiring a troublesome setting or selecting operation with regard to a playback apparatus on a network.

According to an aspect of the present invention, the foregoing object is attained by providing an information processing apparatus having a function for selecting content, which is managed as a content directory, from a playback apparatus and causing the playback apparatus to play back the content, comprising: a setting unit adapted to, if playback of the content has been suspended, store the location of suspension and set the content in the content directory as virtual content; and a playback unit adapted to resume playback of the virtual content from the suspension position if the virtual content has been selected.

According to an aspect of the present invention, the foregoing object is attained by providing an information processing apparatus comprising: a management unit adapted to manage content as a content directory; a setting unit adapted to, if playback of the content has been suspended, set virtual content, which corresponds to the location of suspension, in the content directory; and a supply unit adapted to supply the virtual content and content corresponding to this virtual content as content information.

According to an aspect of the present invention, the foregoing object is attained by providing a method of playing back content of an information processing apparatus having a function for selecting content, which is managed as a content directory, from a playback apparatus and causing the playback apparatus to play back the content, comprising the steps of: if playback of the content has been suspended, storing the location of suspension and setting the content in the content directory as virtual content; and resuming playback of the virtual content from the suspension position if the virtual content has been selected.

According to an aspect of the present invention, the foregoing object is attained by providing a content playback method comprising the steps of: managing content as a content directory; if playback of the content has been suspended, setting virtual content, which corresponds to the location of suspension, in the content directory; and supplying the virtual content and content corresponding to this virtual content as content information.

Further features of the present invention will become apparent from the following description of exemplary embodiments with reference to attached drawings.

BRIEF DESCRIPTION OF THE DRAWINGS

FIG. 5 is a diagram illustrating an example of a content list in the first embodiment;

FIG. 6 is a diagram illustrating a content selection screen that the playback apparatus presents on a display screen based upon information in the content list;

DESCRIPTION OF THE EMBODIMENTS

Preferred embodiments for working the present invention will now be described in detail with reference to the drawings.

First Embodiment

Figure 1:
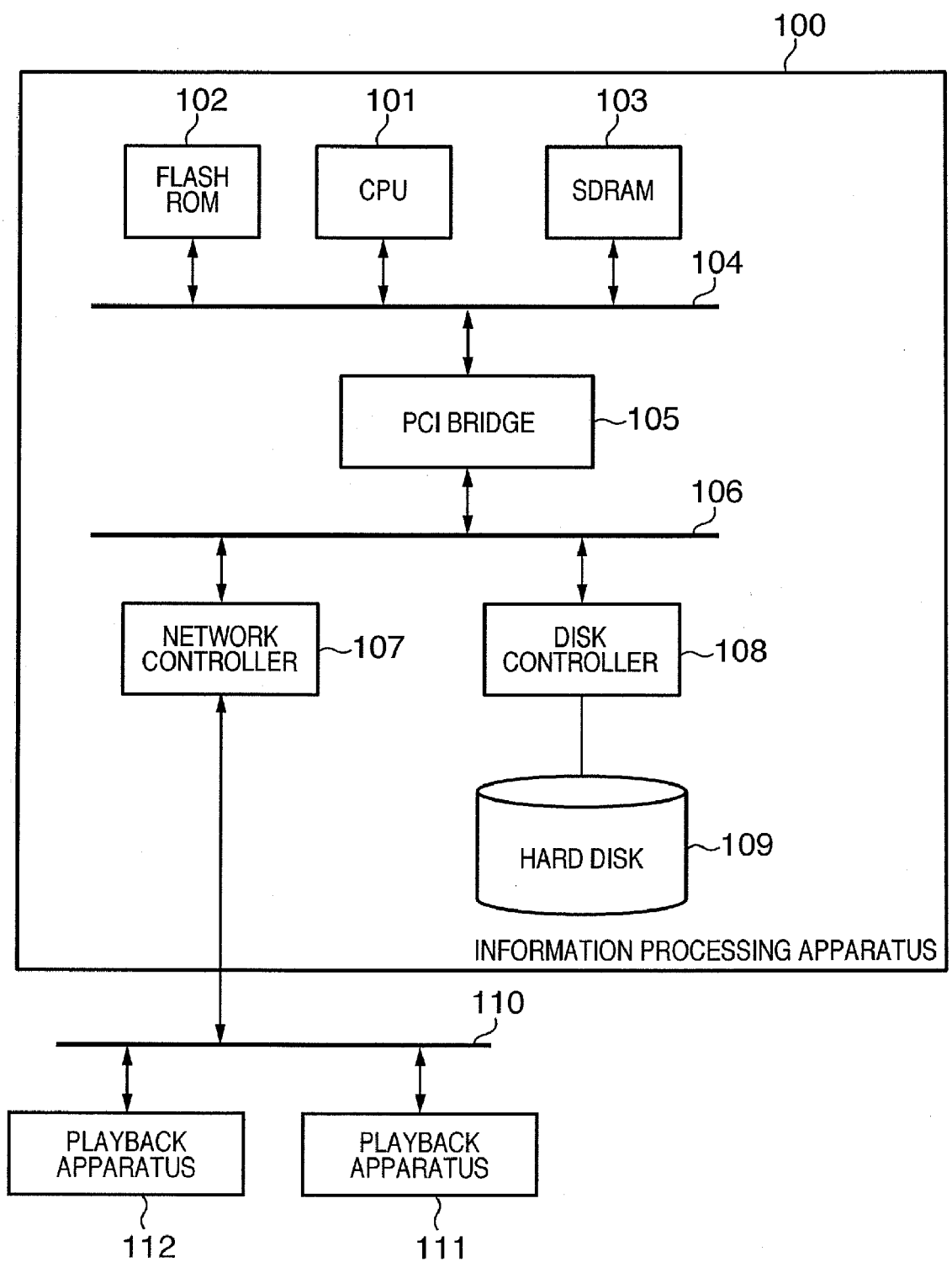
FIG. 1 is a block diagram illustrating an example of the structure of an information processing apparatus according to a first embodiment of the present invention.

FIG. 1 is a block diagram illustrating an example of the structure of an information processing apparatus 100 according to a first embodiment of the present invention. A CPU 101 shown in FIG. 1 controls the overall apparatus, loads a control program that has been stored in a flash ROM 102 in an SDRAM 103 and executes the program. The CPU 101, flash ROM 102 and SDRAM 103 are connected to a host bus 104. A PCI bridge 105 is a device for connecting the host bus 104 and a PCI bus 106.

A network controller 107 and a disk controller 108 are connected to the PCI bus 106. The network controller 107 controls data communication with another communication apparatus on a network 110 by control exercised by the CPU 101. Here the network 110 is either of a wired or wireless network.

The disk controller 108 controls read/write of data from and to a hard disk device 109 by control exercised by CPU 101.

Reproduction apparatuses 111, 112 reproduce content selected by a user from a movie file or still-image file that has been stored in the hard disk device 109 via the network 110. Specific examples of the playback apparatuses 111, 112 are a TV or personal computer, which have a communication function, or a PDA or mobile telephone connected to the information processing apparatus 100 via the network 110.

The information processing apparatus 100 and playback apparatuses 111, 112 comply with standard guidelines stipulated by the industrial organization DLNA (Digital Living Network Alliance). This industrial organization promotes standardization activities for the purpose of interconnecting household devices and personal computers between different manufacturers.

In these standard guidelines, each interconnected apparatus behaves as a device class that conforms to the role of the apparatus.

In the first embodiment, the information processing apparatus 100 behaves as a digital media server (referred to as a "DMS" below) and has a function for distributing content, which has been stored in the hard disk device 109, in response to requests from the playback apparatuses 111, 112.

Further, the playback apparatuses 111, 112 behave as digital media players (referred to as "DMP" below) and have functions for searching content that has been stored in the information processing apparatus 100 and reproducing content distributed. It will be assumed in the first embodiment that when content in the information processing apparatus 100 is being played back by the playback apparatus 111, playback is suspended and is subsequently resumed by the playback apparatus 111 or 112.

According to the standard guidelines, however, if content distributed from the information processing apparatus 100 (DMS) is suspended during playback by the playback apparatus 111 (DMP) and playback is subsequently resumed, such playback will start not from the location of suspension but from the beginning of the content.

Playback from the location of suspension can be achieved by adding a new protocol for the purpose of exchanging resumption-playback information between the DMS and DMP.

In the first embodiment, a protocol stipulated by the standard guidelines is utilized and it is possible for the operator to perform playback from the beginning of the content file (this shall be referred to as "normal playback" below) or playback from the position of the content file at which playback was suspended (this shall be referred to as "resumption playback").

As a result, if the DMP complies with the standard guidelines, selection of normal playback and resumption playback is possible irrespective of manufacturer.

Figure 2:
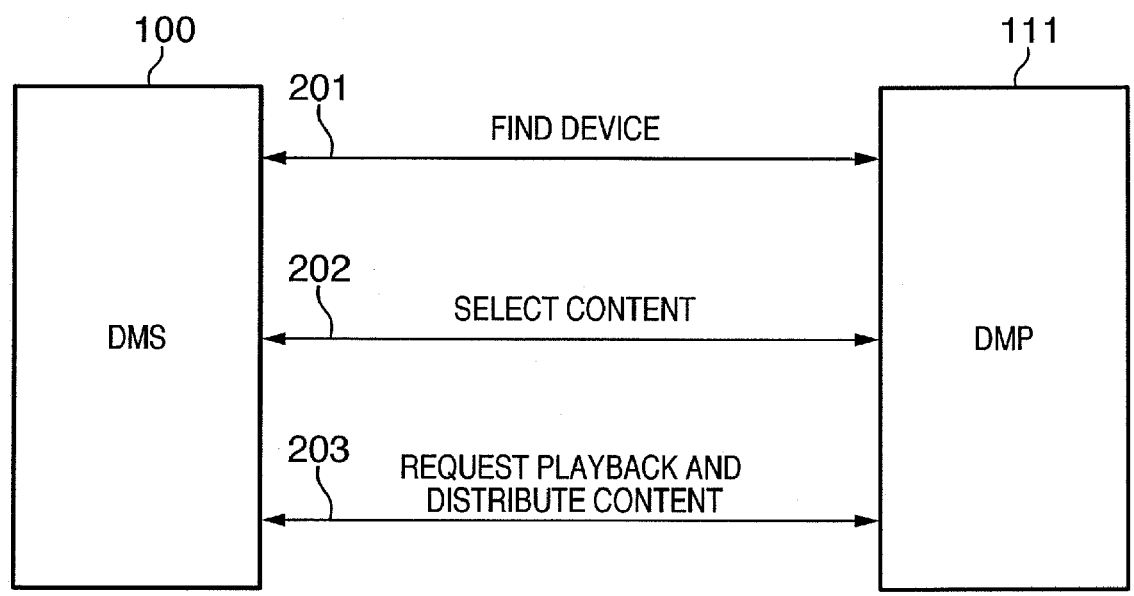
FIG. 2 is a diagram illustrating a procedure for reproducing content via a network in the first embodiment.

FIG. 2 is a diagram illustrating a procedure for reproducing content via a network in the first embodiment. Protocols in accordance with the standard guidelines are executed between the information processing apparatus 100 (DMS) and playback apparatus 111 (DMP). In the first embodiment, it is possible to select normal playback and resumption playback without adding an independent protocol to these protocols.

As illustrated in FIG. 2, first the playback apparatus 111 executes a protocol for finding the information processing apparatus 100 on the network 110 (201). This protocol is executed by SSDP (Simple Service Discovery Protocol), which is part of the UPnP specifications.

Next, a protocol is executed for allowing the playback apparatus 111 to select desired content from content that has been stored in the hard disk device 109 of the information processing apparatus 100 (202). This protocol is executed by a content directory service (CDS), which is part of a standard for interconnecting AV devices based upon the UPnP specifications.

A protocol for distribution of content from the information processing apparatus 100 to the playback apparatus 111 is then executed (203). In the first embodiment, this protocol is executed by HTTP (HyperText Transfer Protocol).

By virtue of the foregoing protocols, content is distributed from the information processing apparatus 100 to the playback apparatus 111, the distributed content is decoded by the playback apparatus 111 and the decoded content is displayed on the display screen to thereby reproduce the content.

Figure 3:
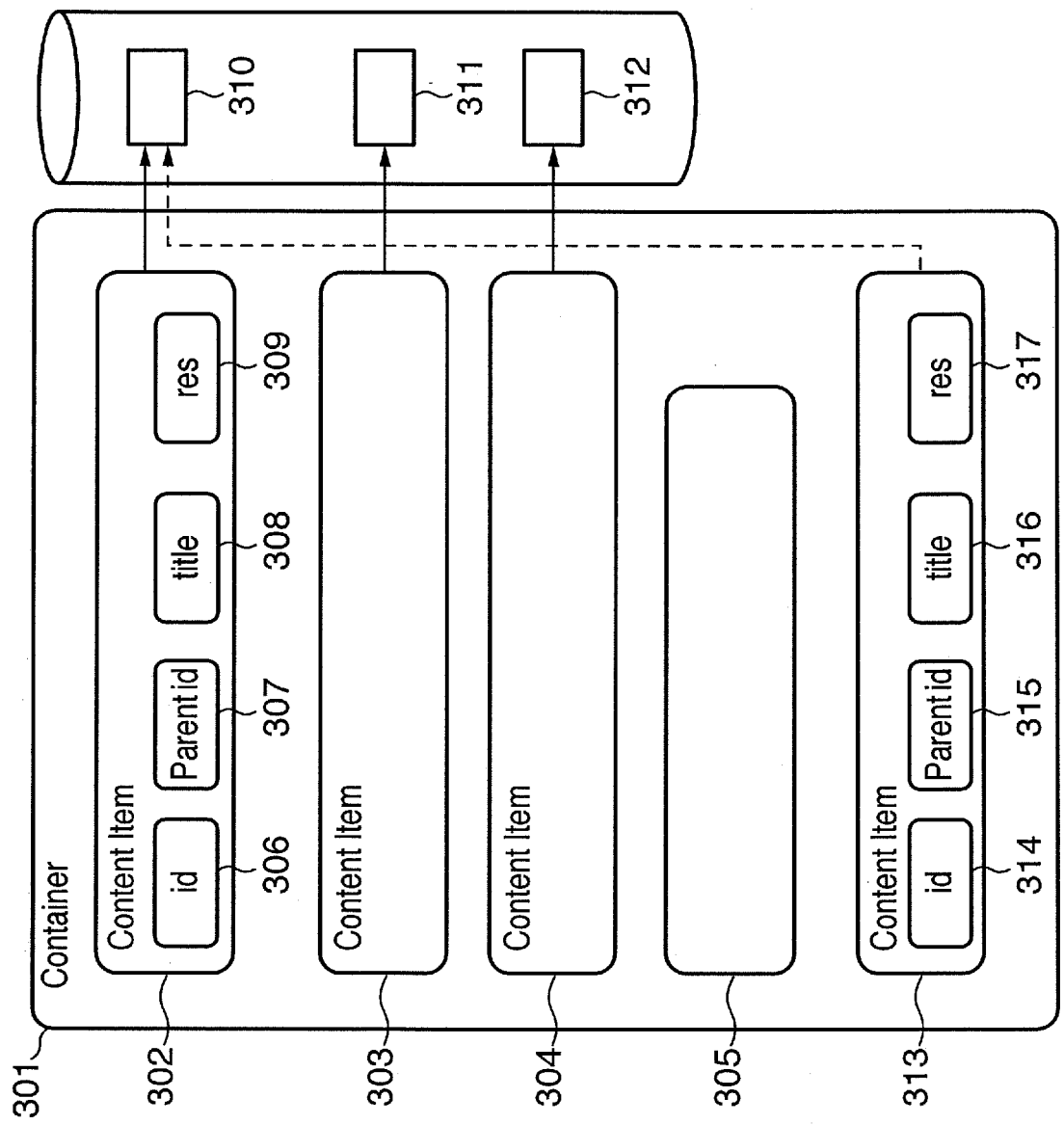
FIG. 3 is a diagram illustrating an example of implementation of content management in the first embodiment.

FIG. 3 is a diagram illustrating an example of implementation of content management in the first embodiment. This is an implementation for managing content that has been stored in the hard disk device 109 of the information processing apparatus 100. As mentioned above, content in this hard disk device 109 is managed as a content directory by the above-mentioned CDS.

Content items 302, 303, 304 shown in FIG. 3 correspond to content such as movie files and still-image files and become the object of search or browsing from the playback apparatus 111 (DMP).

A container 301 is an object that contains a plurality of content items. In the example shown in FIG. 3, the container 301 contains a separate container 305. By thus placing containers in a nested structure, a hierarchical structure can be formed.

A content item 302 has a plurality of properties (306 to 309). The property 306 is identification information (id) identifying the content in a content directory, and the property 307 is identification information (Parent id) identifying a parent object. The property 308 is the title (title) of the content. Here information easily understandable to the user, such as the title of a movie, is set. The property 309 is reference information (res). Here protocol information for accessing content and an URL for designating content are set.

Furthermore, protocol information for accessing thumbnail data for displaying the nature of the content, and the URL thereof, are also set in the reference information 309.

In the first embodiment, it is assumed that the http Get method is employed as the protocol for accessing content and thumbnails.

Actual content 310, 311, 312 corresponds to the content items 302, 303, 304, respectively. Ordinarily, if suspension of playback has not occurred, one content item is registered in the content directory in correspondence with the actual content.

The playback apparatus 111 is capable of accessing actual content by selecting some content item obtained by search or browsing.

The first embodiment is such that in a case where playback of content has been suspended, a content item 313 for resumption playback is registered, thereby providing a selection object for resumption playback based upon a standard technique, namely a content directory.

For example, in a case where playback of actual content 310 by the playback apparatus 111 has been suspended, the information processing apparatus 100 registers the content item 313, which is for resumption playback, separately of content item 302. The operator subsequently accesses the information processing apparatus 100 from the playback apparatus 111 and need only request the information processing apparatus 100 for playback by selecting content item 302 in case of normal playback and content item 313 in case of resumption playback.

A content item for the sake of resumption playback, such as content item 313, that has been registered in the content directory separately of the content item of actual content shall be referred to as "virtual content" below.

In content item 313, identification information separate from the identification information 306 of the actual content is set in identification information 314. Further, a title, which is obtained by additionally furnishing the title 308 of the actual content with information whereby it can be understood that this is content for resumption playback, is set in a title 316. For example, with regard to "Movie" that has been set in the title 308 of the actual content, a title such as "Movie—Stopped" is set in the title 316.

Further, an URL separate from the URL that has been set in the reference information 309 is set in reference information 317. In other words, since the playback apparatus 111 designates content and requests playback by an URL, whether the request is for normal playback or resumption playback can be discriminated on the side of the information processing apparatus 100 based upon the reference information 317. Furthermore, an URL of thumbnail data separate from the URL of thumbnail data that has been set in the reference information 309 is set in the reference information 317. That is, owing to the provision of thumbnail data for resumption playback that is separate from thumbnail data for normal playback, it is possible for the operator of the playback apparatus 111 to present, in easily understandable form, information relating to resumption playback.

Thus, in the first embodiment, a content item for resumption playback is registered separately of a content item for normal playback via a standard technique, namely a content directory.

As a result, a candidate for normal playback of content and a candidate for resumption playback of content can be presented to the playback apparatus 111 separately via the standard technique, i.e., a content directory.

Figure 4:
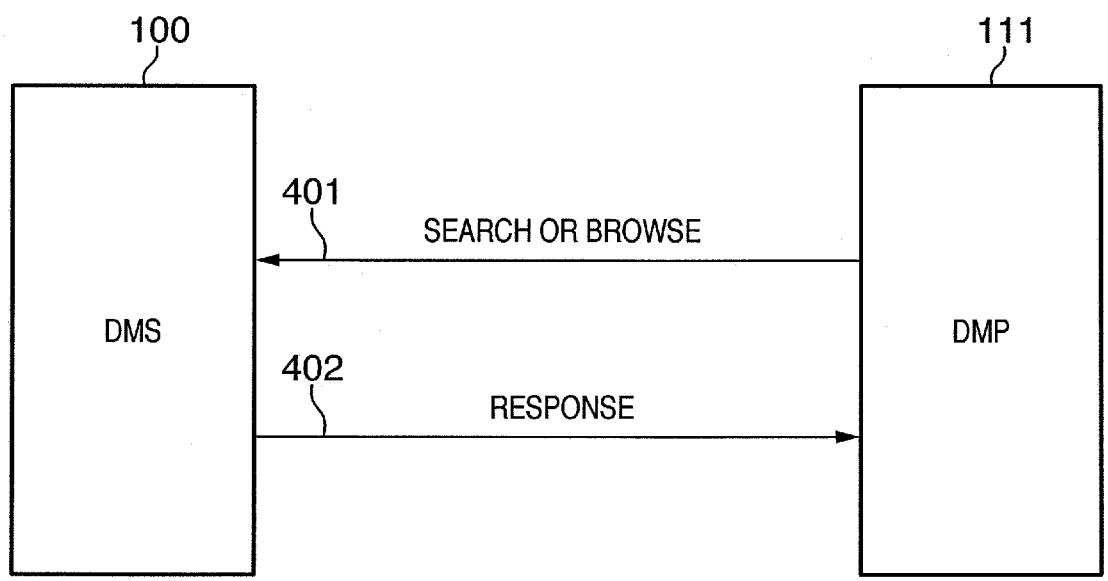
FIG. 4 is a diagram illustrating a procedure (which corresponds to 202 in FIG. 2) for selecting content, which is to be reproduced, from a playback apparatus.

FIG. 4 is a diagram illustrating a procedure (which corresponds to 202 in FIG. 2) for selecting content, which is to be reproduced, from the playback apparatus 111. First, the playback apparatus 111 sends the information processing apparatus 100 a search command or browse command based upon CDS (401). The search command requests a list of content that matches specified search conditions. The browse command requests a list of content contained in a certain container.

Next, as a response to the search command or browse command from the playback apparatus 111, the information processing apparatus 100 sends back a content list 500 of the kind shown in FIG. 5. Properties (the title 308 and reference information 309, etc.) of a content item that matches the conditions of the search or browse command have been set in the content list 500.

In the example of FIG. 5, information 501, 502, 503 concerning three content items has been set as the content list 500. The content-item information 501 corresponds to content whose identification information is "100" and whose title is "Love Story". The content-item information 502 corresponds to content whose identification information is "101" and whose title is "Comedy". Furthermore, the content-item information 503 corresponds to content whose identification information is "102" and whose title is "Love Story—Stopped".

The operator of the playback apparatus 111 ascertains the nature of the content based upon these items of information and accesses the actual content.

Here the content whose identification information is "102" is virtual content for which the content whose identification information is 100 is adopted as the actual content. Accordingly, the operator of the playback apparatus 111 need only select the content item whose identification information is "100" in case of normal playback and the content item whose identification information is "102" in case of resumption playback.

Thus, the information of each content item for resumption playback is set in the content list 500 and sent back to the playback apparatus 111. As a result, the playback apparatus 111 selects the content item for resumption playback and issues a playback request, thereby enabling the start of resumption playback of the desired content.

FIG. 6 is a diagram illustrating a content selection screen 600 that the playback apparatus 111 presents on a display screen based upon information in the content list 500. It should be noted that the content selection screen 600 is an example of display in a case where thumbnail data of content is not used.

In FIG. 6, a title display column 601 displays the titles of content. A type display column 602 displays the type of content, i.e., either a movie (VIDEO), still image (IMAGE) or music (AUDIO). A size display column 603 displays the actual data sizes of content.

Here content information 611, 612, 613 is displayed based upon the content-item information 501, 502, 503, respectively, in the content list 500. The information 612 on selection screen 600 is information concerning virtual content for which the information 611 is the actual content.

Accordingly, in a case where a thumbnail of content is not used, as in the manner of content selection screen 600 in FIG. 6, the operator discriminates the virtual content for resumption playback based upon the title display column 601.

Figure 7:
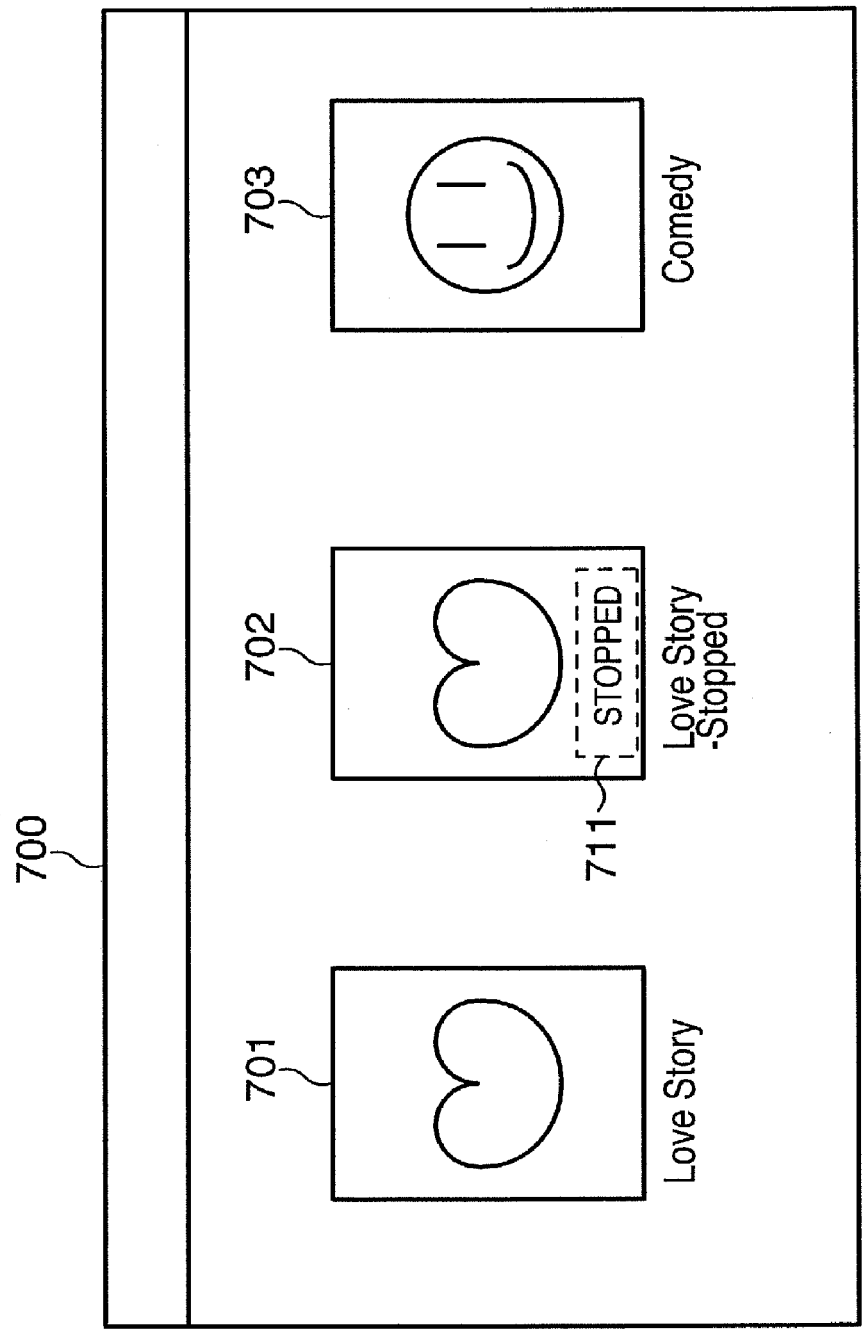
FIG. 7 is a diagram illustrating a content selection screen in a case where thumbnails of content are used.

On the other hand, FIG. 7 is a diagram illustrating a content selection screen 700 in a case where thumbnails of content are used. Thumbnail images of content are displayed on the content selection screen 700.

With regard to the display of thumbnails, the information processing apparatus 100 reads protocol information and an URL for accessing a thumbnail image from the reference information 309 of the content directory shown in FIG. 3 and sets these in the content list 500 directed to the playback apparatus 111.

First, after acquiring the content list 500 from the information processing apparatus 100, the playback apparatus 111 acquires thumbnail images based upon the protocol information and URLs that have been set in the content list 500 and displays these on the display as the content selection screen 700.

Here thumbnail images 701, 702, 703 corresponding to the content-item information 501, 502, 503 that has been set in the content list 500 are displayed.

Further, the thumbnail image 702 on selection screen 700 is a thumbnail image of virtual content for which the thumbnail image 701 is the actual content. By way of example, the thumbnail image 702 is generated by overlaying a prescribed image (image 711 in the example of FIG. 7) on the thumbnail image of the content item. Alternatively, the thumbnail image may be generated by blending a prescribed image with the thumbnail image of the actual content.

Next, by referring to the selection screen 600 or selection screen 700 of the playback apparatus 111, the operator selects the desired content and instructs the playback apparatus 111 to play back this content. In response to being so instructed, the playback apparatus 111 reads the protocol information and URL for accessing the selected content out of the content list 500. The protocol for distributing the content from the information processing apparatus 100 is started through the procedural step (203) shown in FIG. 2.

Thus, in accordance with the first embodiment, the playback apparatus 111 presents a display of information concerning virtual content for the purpose of resumption playback based upon a content list acquired from the information processing apparatus 100 using a content directory service, which is a standard technique.

As a result the operator of the playback apparatus 111 is capable of specifying resumption playback in addition to normal playback with regard to a single item of content.

Figure 8:
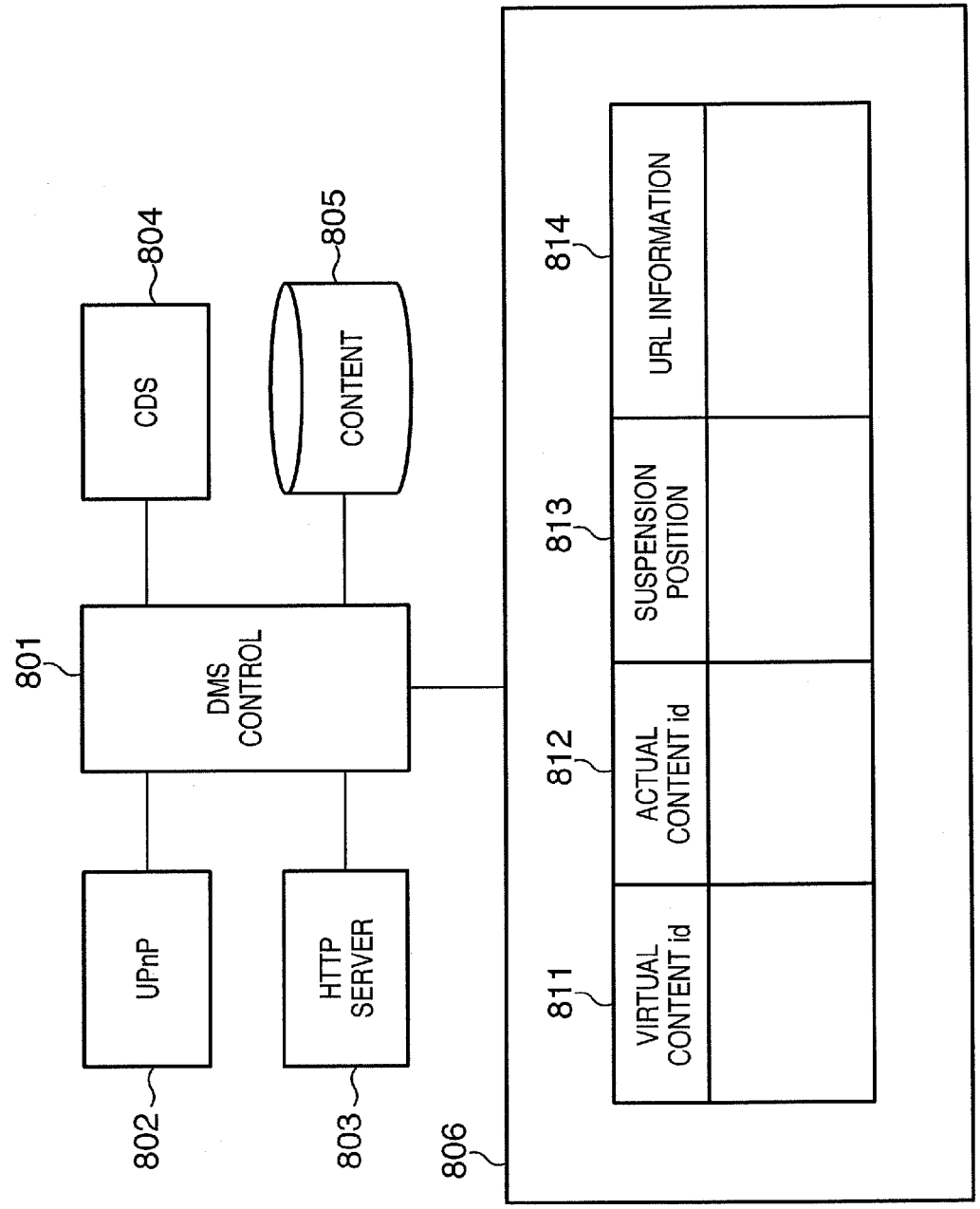
FIG. 8 is a diagram illustrating important modules of a control program stored in a flash ROM of the information processing apparatus.

FIG. 8 is a diagram illustrating important modules of a control program stored in the flash ROM 102 of the information processing apparatus 100. In FIG. 8, a DMS control module 801 controls operation as a DMS stipulated by standard guidelines, and operation regarding resumption playback, which is an additional function. A UPnP module 802 is a module for executing the UPnP protocol necessary for operation as a DMS. An HTTP server module 803 is a module for executing an HTTP server function for distributing content and thumbnail data to the DMP.

A CDS module 804 is a module for executing the function of a CDS necessary for operation as a DMS. Content and a content directory 805 are stored in the hard disk device 109 and are constituted by a prescribed file system.

It should be noted that the DMS control module 801 is so adapted that the URL of content that has been registered in the content and content directory 805 is capable of being acquired from a storage location in the file system.

Resumption-playback management information 806 manages content whose playback has been suspended in mid-course, namely content that is to undergo resumption playback. This information is stored in the hard disk device 109. The resumption-playback management information 806 is composed of virtual-content identification information (id) 811, actual-content identification information (id) 812, suspension position 813 and URL information 814.

The virtual-content identification information 811 is information (which corresponds to the identification information 314 in FIG. 3) for identifying the virtual content in the content directory. With regard to one item of virtual content, the virtual-content identification information 811 is stored as well as actual-content identification information 812, suspension position 813 and URL information 814 in correspondence therewith.

In order to access thumbnail data of virtual content, first the content item 313 in the content directory is specified from the virtual-content identification information 811. Next, the URL of the thumbnail data of virtual content is acquired from the reference information 317, which is a property of the content item 313.

The actual-content identification information 812 is identification information (which corresponds to the identification information 306 shown in FIG. 3) in the content directory of the corresponding actual content.

In order to specify the starting position of resumption playback of the actual content, the content item 302 in the content directory is specified from the actual-content identification information 812. Next, the URL of the actual content is acquired from the reference information 309, which is a property of the content item 302.

The DMS control module 801 is capable of acquiring the storage position in the hard disk device 109 from the URL of the content, and therefore the starting position of resumption playback can be specified from the storage position and suspension position 813.

The suspension position 813 is information that indicates the starting position of resumption playback. A byte offset from the beginning of the content file is set. In a case of playback of content for which suspension of playback has not occurred, i.e., in case of normal playback, data from the beginning of the content file is distributed to the playback apparatus 111. In case of resumption playback, however, data from the position information concerning the suspension position 813 is distributed to the playback apparatus 111.

Position information set in the suspension position 813 is adjusted in such a manner that decoding of content will be performed normally on the side of the playback apparatus 111. For example, in a case where the media format of content is MPEG2, the information is adjusted in such a manner that decoding will start from the beginning of GOP on the side of the playback apparatus 111.

It should be noted that before content whose media format is MPEG is distributed to the playback apparatus 111 from the middle of a file, it is necessary to distribute a sequence header that has been stored in the vicinity of the beginning of this content.

The URL of virtual content is set in the URL information 814. With regard to the URL of this virtual content, it can be acquired from the virtual-content identification information 811 by utilizing the content directory.

When there is a playback request from the playback apparatus 111, the URL of content is specified and therefore the DMS control module 801 determines whether the URL specified by the playback apparatus 111 has been recorded in the resumption-playback management information 806. As a result, whether the playback request is for virtual content, i.e., whether it is a resumption-playback request, can be determined with ease.

If playback of content is suspended, the DMS control module 801 registers in the content directory the content item of the virtual content for resumption playback of the content.

Information regarding this virtual content is recorded with respect to the resumption-playback management information 806.

Further, in a case where multiple items of virtual content have been generated from a single item of actual content, information is recorded in the resumption-playback management information 806 for every item of virtual content, thereby making it possible to manage multiple items of resumption playback with respect to a single item of actual content.

Figure 9:
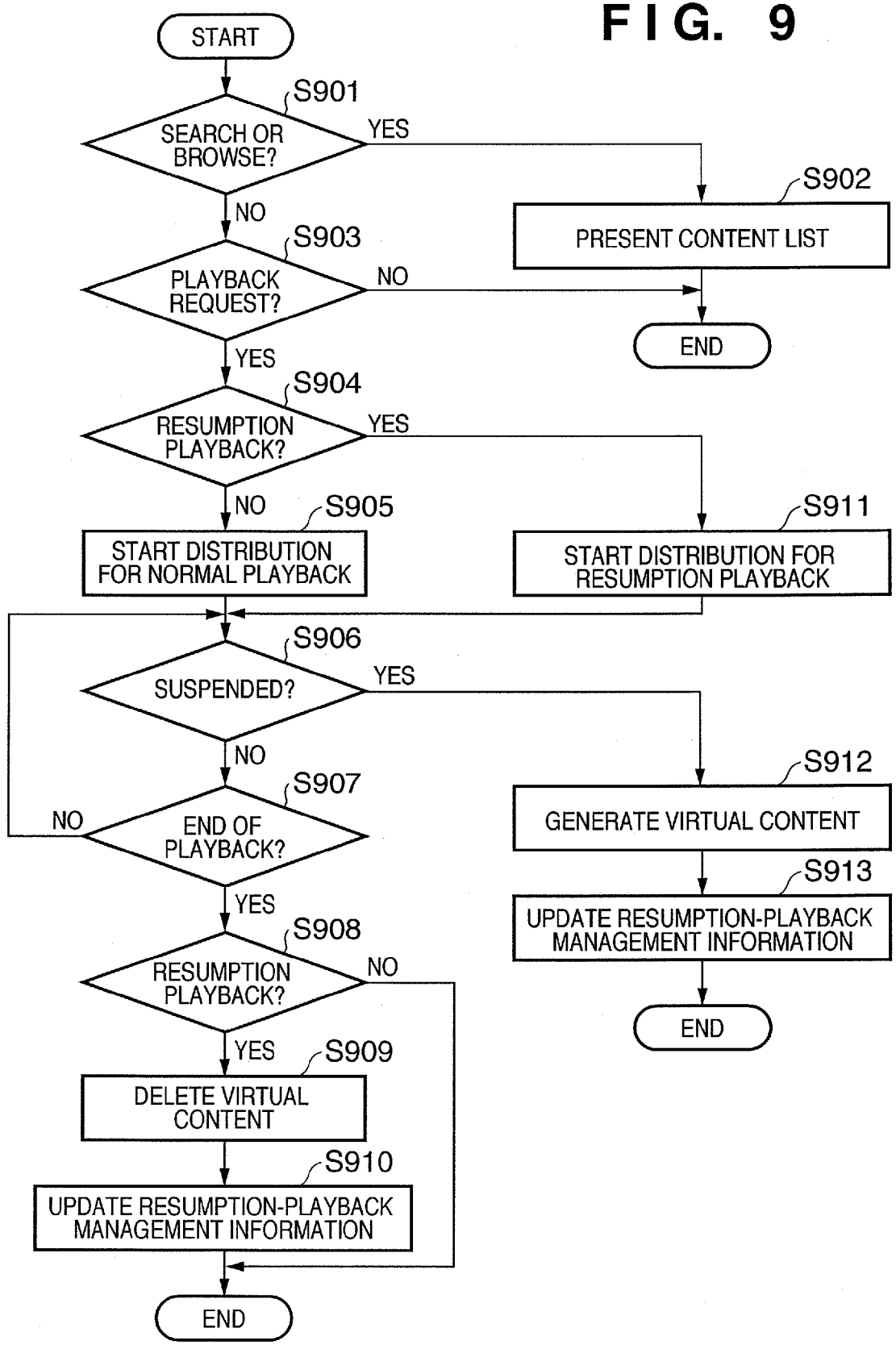
FIG. 9 is a flowchart of some operations performed by a DMS control module, namely processing with respect to a content search or browse request from the playback apparatus and processing with respect to a playback request from the playback apparatus.

The operation of the DMS control module 801 will be described with reference to FIG. 9. FIG. 9 is a flowchart of some operations performed by the DMS control module 801, namely processing with respect to a content search or browse request from the playback apparatus 111 and processing with respect to a playback request from the playback apparatus 111.

First, at step S901, the DMS control module 801 determines whether search or browse has been received from the playback apparatus 111 as a command based upon CDS. If the command is search or browse, control proceeds to step S902, where information of the content item that matches the conditions specified by search or browse are acquired from the content directory and presented to the playback apparatus 111 as a content list.

The operator of the playback apparatus 111 selects the desired content from the content list presented and instructs the playback apparatus 111 to perform playback. In response, the playback apparatus 111 acquires information, which is for accessing the content selected by the operator, from the presented content list in accordance with the playback instruction and sends the information processing apparatus 100 playback request.

In the first embodiment, the content playback request is performed by the Http Get method, and the selected content is reported to the information processing apparatus 100 as an URL.

If the decision rendered at step S901 is that the command is not search or browse, control proceeds to step S903, where the DMS control module 801 determines whether a playback request has been received. If a playback request has been received, control proceeds to step S904, where it is determined whether the playback request is a request for normal playback or a request for resumption playback.

In the first embodiment, the protocols between the playback apparatus 111 (DMP) and the information processing apparatus 100 (DMS) are implemented by the standard protocols stipulated by the guidelines mentioned above. This means that whether the playback request from the DMP is for normal playback or resumption playback cannot be distinguished. Accordingly, it is necessary that the discrimination as to whether the request is for normal playback or resumption playback be performed on the side of the information processing apparatus 100.

More specifically, as described earlier with reference to FIG. 8, it is determined whether the URL specified by the playback apparatus 111 has been recorded in the resumption-playback management information 806. If it has been recorded, it is judged that the request is for resumption playback. If it has not been recorded, then it is judged that the request is for normal playback.

If the normal playback has been determined, then control proceeds to step S905, where distribution for normal playback is started. That is, the content file to be played back, which has been stored in the hard disk device 109, is specified from the URL specified by the playback apparatus 111, and distribution of data starts from the leading data of the file.

If resumption playback has been determined at step S904, then control proceeds to step S911, where distribution for resumption playback is started.

More specifically, first the DMS control module 801 refers to the resumption-playback management information 806 and acquires the actual-content identification information 812 and suspension position 813 that have been stored in correspondence with the URL designated by the playback apparatus 111. Next, the URL of the actual content is acquired from the actual-content identification information 812. Then, from the acquired URL and suspension position 813, the DMS control module 801 specifies the playback-target content file that has been stored in the hard disk device 109 and the starting position of resumption playback and starts distribution of data from this starting position.

Next, at step S906, it is determined whether the playback apparatus 111 has suspended playback. For example, suspension of playback is judged to have occurred if interruption of a TCP connection by the playback apparatus 111 is detected.

Alternatively, if a command indicating an explicit suspension request from the playback apparatus 111 is specified in the standard guidelines in the future, it will suffice to judge that playback suspension has occurred in response to receipt of this command.

If playback is suspended by the playback apparatus 111, control proceeds to step S912. Here the content item of the virtual content for resumption playback of the content is registered in the content directory. However, if resumption playback has been determined at step S904, the content item of the virtual content registered previously is deleted from the content directory. At this time, the thumbnail data for resumption playback is generated in the hard disk device 109 and the URL thereof is set in the reference information 317.

Next, at step S913, the information regarding the virtual content is registered in the resumption-playback management information 806 and the content of the resumption-playback management information 806 is updated. However, if resumption playback has been determined at step S904, the previously registered information is deleted from the resumption-playback management information 806.

Further, if playback has not been suspended at step S906, control proceeds to step S907, where it is determined whether playback has ended. If playback has not ended, control returns to step S906. If playback has ended, control proceeds to step S908, where it is determined whether the playback that ended is resumption playback. In case of resumption playback, control proceeds to step S909, where the content item of the virtual content for resumption playback is deleted from the content directory. Then, at step S910, information regarding the virtual content is deleted from the resumption-playback management information 806 and the content of the resumption-playback management information 806 is updated.

In the first embodiment, as described above, it is so arranged that virtual content for which suspended playback will be resumed is registered in the content directory when playback of content is suspended, and this becomes a content item that is to be selected from the DMP.

As a result, it is possible to execute normal playback and resumption playback of content from the DMP stipulated by the above-mentioned guidelines. That is, the effect obtained is that if the DMP is one that complies with the above-mentioned guidelines, then it is possible to select normal playback and resumption playback irrespective of the manufacturer.

Second Embodiment

A second embodiment of the present invention will now be described in detail with reference to the drawings. Components of the information processing apparatus in the second embodiment are similar to those of the first embodiment shown in FIG. 1 and need not be described again. How the second embodiment differs from the first embodiment will be described below.

The first embodiment is such that if playback has been suspended by the operators of a plurality of reproduction apparatuses with regard to a single item of content, it will suffice to generate virtual content corresponding to each suspension of playback and register this virtual content in the content directory.

At such time it is required that the information processing apparatus 100 indicate to the operator of the playback apparatus 111 which virtual content in the content directory corresponds to the playback suspended by this operator.

In order to deal with this problem, the information processing apparatus 100 in the second embodiment is so adapted that the operator of the playback apparatus 111 can readily perform resumption playback of content suspended by the operator him/herself.

Figure 10:
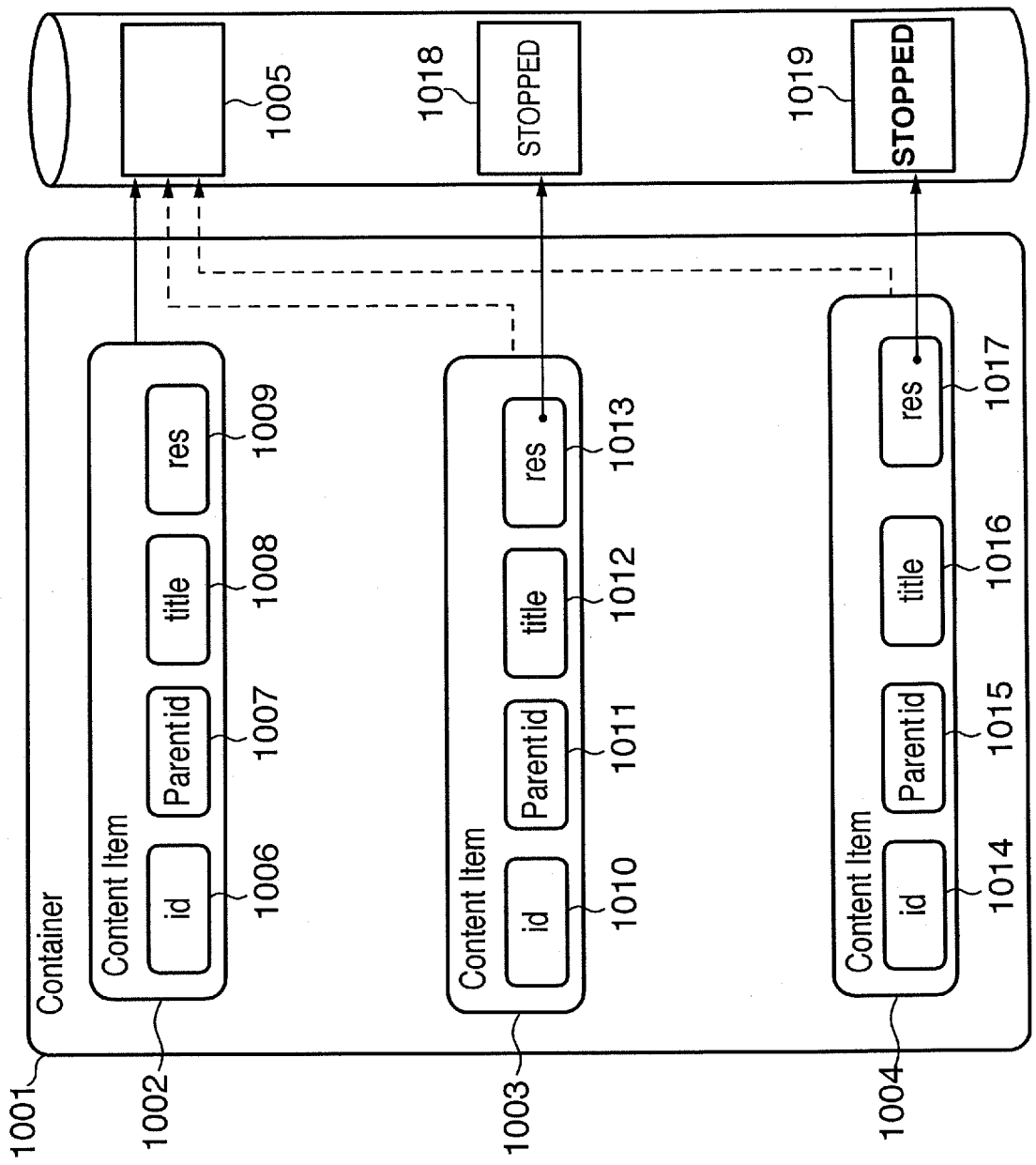
FIG. 10 is a diagram illustrating an example of implementation of content management in a second embodiment of the present invention.

FIG. 10 is a diagram illustrating an example of implementation of content management in a second embodiment of the present invention. A content item 1002 in FIG. 10 corresponds to actual content 1005 and properties have been set in this content item in a manner similar to that of the first embodiment.

Reference numerals 1003 and 1004 both denote content items of virtual content generated in response to suspension of playback of the actual content 1005. In a manner similar to that of the first embodiment, properties have been set in these content items, namely identification information (id) 1010, . . . , reference information (res) 1013, identification information (id) 1014, . . . , reference information (res) 1017.

Further, two different items of thumbnail data have been generated in the hard disk device 109 with respect to two content items 1003, 1004. The URL of each item of thumbnail data has been set in the reference information 1013, 1017.

Thus, in the second embodiment, mutually different items of thumbnail data are generated and assigned with respect to two or more items of virtual content generated from the same actual content.

Figure 11:
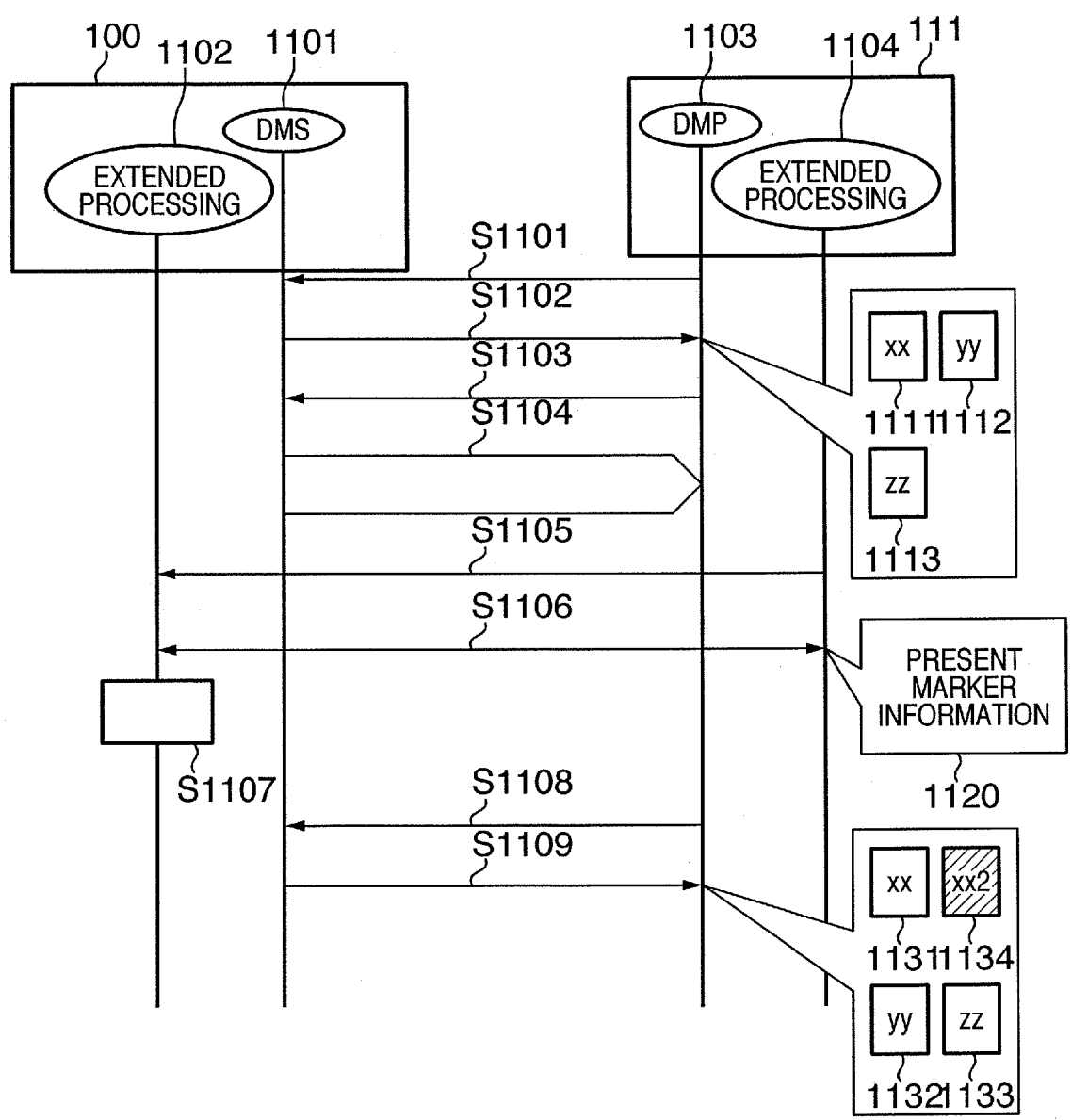
FIG. 11 is a diagram illustrating processing procedures of the information processing apparatus and playback apparatus in the second embodiment.

FIG. 11 is a diagram illustrating processing procedures of the information processing apparatus 100 and playback apparatus 111 in the second embodiment. Here the information processing apparatus 100 is indicated as being split between processing 1101 as DMS stipulated by guidelines and extended processing 1102. Further, the playback apparatus 111 also is indicated as being split between processing 1103 as DMP stipulated by guidelines and extended processing 1104.

First, at step S1101, the playback apparatus 111 sends the information processing apparatus 100 a content search or browse request. Next, at step S1102, the information processing apparatus 100 sends the playback apparatus 111 a content list in which content information that matches the search or browse conditions has been set. At this time the playback apparatus 111 acquires thumbnail data based upon the URL of thumbnail data of each item of content that has been set in the content list and displays thumbnails 1111 to 1113 on the display screen.

Next, at step S1103, the playback apparatus 111 sends the information processing apparatus 100 a playback request in which content of some kind has been specified. Then, at step S1104, the information processing apparatus 100 distributes the content specified at step S1103 above. A playback suspension request is issued from the playback apparatus 111 at step S1105.

At step S1106, the playback apparatus 111 executes a protocol for deciding marker information for the purpose of visually identifying that content is virtual content, which the playback apparatus itself has suspended, at the time of later selection of virtual content. The marker information is information that is reflected in properties, etc., when the information processing apparatus 100 registers the virtual content in the content directory at step S1107.

Methods of deciding the marker information include having the information processing apparatus 100 select it from a prescribed algorithm and report it to the playback apparatus 111, or presenting a prescribed number of choices on the side of the playback apparatus 111 and allowing the operator to select one.

If information for identifying the operator is obtained, marker information conforming to this information may be selected.

The marker information decided is displayed on the display unit of the playback apparatus 111 as indicated at 1120 in FIG. 11 and is thus reported to the operator.

In the second embodiment, blue, red, green and yellow color information is used as the marker information so as to facilitate easy memorization by the operator.

By virtue of the foregoing, the operator is capable of discriminating virtual content that the operator per se has suspended even in a case where two or more items of virtual content have been generated from a single item of actual content.

At step S1107, the information processing apparatus 100 records the content item of virtual content for resumption playback in the content directory in a manner similar to that of the first embodiment. Information with respect to this virtual content is recorded with regard to the resumption-playback management information 806 to thereby update the resumption-playback management information 806.

Although thumbnail data for this virtual content is generated in the hard disk device 109, processing for reflecting the marker information decided at step S1106 in the thumbnail data is executed. Further, although the thumbnail data of the virtual content is generated by overlaying a prescribed image on the thumbnail image of the actual content, the color of the prescribed image is made color information (blue, red, green or yellow), which is the marker information decided at step S1106.

By way of example, in a case where red has been decided as the marker information at step S1106, the red prescribed image is overlaid on the thumbnail image of the actual content and the thumbnail data of the virtual content is generated.

A connection is thenceforth re-established between the playback apparatus 111 and the information processing apparatus 100 and, at step S1108, the playback apparatus 111 sends the information processing apparatus 100 a content search or browse request. Then, at step S1109, the information processing apparatus 100 sends the playback apparatus 111 a content list in which content information that matches the search or browse conditions has been set.

At this time the playback apparatus 111 acquires thumbnail data based upon the URL of the thumbnail data of each item of content that has been set in the content list and displays thumbnails 1131 to 1133 (which correspond to 1111 to 1113, respectively) on the display unit.

Furthermore, since the virtual content information generated at step S1107 also has been set in the acquired content, thumbnail data is acquired based upon the URL of the virtual content and a thumbnail 1134 is displayed on the display unit.

Here the marker information decided at step S1106 has been reflected in the thumbnail 1134. Accordingly, if the operator is the operator of the playback apparatus 111 that was operated at step S1106, then the fact that this operator's own suspended content corresponds to the thumbnail 1134 can be discriminated.

A playback request in which the virtual content that the operator per se has suspended is specified is subsequently sent from the playback apparatus 111 to the information processing apparatus 100 and resumption playback starts.

In accordance with the second embodiment, when content playback is suspended, marker information for visually identifying that content is virtual content that the playback apparatus 111 per se suspended is decided and the marker information is reflected in information (a thumbnail, etc.) presented to the DMP of the virtual content.

As a result, even if playback suspension from two or more operators has been generated with regard to a single item of content, each operator can discriminate which item of virtual content corresponds to the playback suspension initiated by this operator.

It should be noted that the present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

Furthermore, besides the case where the aforesaid functions are implemented by executing the program codes read by a computer, it goes without saying that the present invention also covers a case where an operating system or the like running on the computer performs a part of or the entire actual process based upon the designation of program codes and implements the functions of the embodiments by this processing.

Furthermore, it goes without saying that the invention also covers a case where the program code read from the recording medium is written to a memory provided on a function expansion board inserted into the computer or provided in a function expansion unit connected to the computer, after which a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249945,filed Aug. 30, 2005, which is hereby incorporated by Reference herein its entirety.

What is claimed is:

1. An information processing apparatus having a function for distributing content to a playback apparatus, comprising:
   a storage unit adapted to, if playback of the content has been suspended by the playback apparatus, store a suspension position in the content;
   a generation unit adapted to, if playback of the content has been suspended by the playback apparatus, generate virtual content information used so that a user instructs the playback of the content from the suspension position stored by the storage unit based on the content;
   a notification unit adapted to notify the playback apparatus of the virtual content information generated by the generation unit with information of the content in response to a request for the content from the playback apparatus;
   a distribution unit adapted to, if the information of the content notified by the notification unit has been selected, distribute the content from the beginning, or, if the virtual content information notified by the notification unit has been selected, distribute the content from the suspension position stored in the storage unit; and
   a deletion unit that, when the playback of the content has ended in the playback apparatus, does not delete the virtual content information if the content is distributed from the beginning by the distribution unit, and deletes the virtual content information if the content is distributed from the suspension position by the distribution unit.

2. The apparatus according to claim 1, wherein selection of the virtual content information in the playback apparatus is performed by generating a title capable of identifying that the playback of the content has been suspended and allowing the virtual content information to be selected based upon this title.

3. The apparatus according to claim 2, wherein the title capable of identifying that the playback of the content has been suspended is generated based upon a title of the content.

4. The apparatus according to claim 1, wherein selection of the virtual content information in the playback apparatus is performed by generating a thumbnail image capable of identifying that the playback of the content has been suspended and allowing the virtual content information to be selected based upon this thumbnail image.

5. The apparatus according to claim 4, wherein the thumbnail image capable of identifying that the playback of the content has been suspended is generated based upon a thumbnail image indicative of the content.

6. The apparatus according to claim 5, wherein in a case where two or more items of virtual content information have been generated from a single item of content, each item of virtual content information is reflected in the thumbnail image by marker information in a discriminating manner.

7. The apparatus according to claim 6, wherein the marker information is color information.

8. The apparatus according to claim 7, wherein said information processing apparatus and playback apparatus play back content based by protocols that are based upon a content directory service stipulated by the UPnP AV specifications.

9. The apparatus according to claim 1, further comprising a presenting unit adapted to present said playback apparatus with virtual content information that has been set by the generation unit.

10. The apparatus according to claim 1, wherein the content is managed as a content directory.

11. A method of playing back content of an information processing apparatus having a function for distributing content to a playback apparatus, comprising the steps of:

if playback of the content has been suspended by the playback apparatus, storing a suspension position in the content;

if playback of the content has been suspended by the playback apparatus, generating virtual content information used so that a user instructs the playback of the content from the suspension position stored by the storage unit based on the content;

notifying the playback apparatus of the virtual content information generated in the generating step with information of the content in response to a request for the content from the playback apparatus;

if the information of the content notified in the notifying step has been selected, distributing the content from the beginning, or, if the virtual content information notified in the notifying step has been selected, distributing the content from the suspension position stored in the storing step; and when the playback of the content has ended in the playback apparatus, keeping the virtual content information if the content is distributed from the beginning, and deleting the virtual content information if the content is distributed from the suspension position.

12. A non-transitory computer-readable recording medium on which the program for causing a computer to execute the method of playing back content set forth in claim 11 has been recorded.

* * * * *